United States Patent [19]

Niehaus

[11] Patent Number: 5,422,827
[45] Date of Patent: Jun. 6, 1995

[54] INTEGRATED VIDEO SCALING AND SHARPENING FILTER

[75] Inventor: Jeffrey A. Niehaus, Dallas, Tex.

[73] Assignee: Cirrus Logic, Inc., Fremont, Calif.

[21] Appl. No.: 17,696

[22] Filed: Feb. 12, 1993

[51] Int. Cl.⁶ ............................................. H03H 21/00
[52] U.S. Cl. .................................. 364/514 R; 364/149
[58] Field of Search ...................... 364/514, 149, 916.3; 570/572, 724.01, 825; 455/307, 188.1; 330/306

[56] References Cited

U.S. PATENT DOCUMENTS

| | | | |
|---|---|---|---|
| 4,359,778 | 11/1982 | Lee | 364/825 |
| 4,703,447 | 10/1987 | Lake, Jr. | 364/825 |
| 4,729,112 | 3/1988 | Millar | 364/724 |
| 5,089,981 | 2/1992 | Cabot | 364/724.16 |
| 5,383,457 | 1/1995 | Cohen | 364/413.25 |

OTHER PUBLICATIONS

New Results in the Design of Digital Interpolators, G. Betken, L. W. Perks, & H. W. Schussler, IEEE Transactions on Acoustics, Speech and Signal Processing, vol. ASSP-23, No. 3, Jun. 1975, pp. 301-309.

A Digital Signal Processing Approach to Interpolation, R. W. Schafer & L. R. Rabiner, Proceedings of the IEEE, vol. 61, No. 6, Jun. 1973, pp. 692-702.

Digital Image Processing, W. K. Pratt, copyright 1991, Wiley-Interscience Publication, pp. 112-120, 303-306, 441-445.

Two Dimensional Signal and Image Processing, Jae S Lim, Prentice Hall, 1990, pp. 495-497.

C Language Algorithms for Digital Signal Processing, P. M. Embree, B. Kimble, Prentice Hall, 1991, pp. 127-186-195.

Primary Examiner—Emanuel T. Voeltz
Assistant Examiner—Craig Steven Miller
Attorney, Agent, or Firm—Winstead Sechrest & Minick

[57] ABSTRACT

An apparatus and method for processing a real input signal representing frames of video information is disclosed. The apparatus and method are embodied in a digital filter comprising means for filtering a real input signal to produce therefrom a real output signal having desired characteristics, the filtering means selecting and acting in accordance with ones of a series of single filter operating parameters selected as a function of real input signal conditions and means for recalling the selected ones of the parameters from a memory, the parameters mathematically derived by simulating a plurality of virtual input signals and filtering the virtual input signals through multiple virtual filters to produce virtual desired output signals.

36 Claims, 6 Drawing Sheets

INTEGRATED VIDEO SCALING AND SHARPENING FILTER

TECHNICAL FIELD OF THE INVENTION

The present invent ion relates, in general, to digital signal filters and, more particularly, to a polyphase filter that can enlarge a video image and sharpen signal transitions to increase image sharpness and fidelity.

BACKGROUND OF THE INVENTION

Many fields of science and engineering, such as physics, communications, medicine, control systems and radar, are concerned with the detection and manipulation of signals. In these applications and in many others, it is desirable that the frequency spectrum of a signal be modified, reshaped or otherwise manipulated according to a particular specification. For example, the process may include amplifying or attenuating a range of frequency components and rejecting or isolating one specific frequency component.

Any system or network that exhibits frequency-selective characteristics is called a filter. Several types of filters can be identified: lowpass filters ("LPF") that pass only the low frequencies, highpass filters ("HPF") that pass high frequencies, bandpass filters ("BPF") that pass a band of frequencies, and band-reject frequencies that reject a band of frequencies. Filters are used in a variety of applications, such as removing noise from a signal, removing signal distortion caused by a transmission channel, separating two or more distinct signals that were mixed to maximize communication channel utilization, demodulating signals, and converting discrete-time signals into continuous-time signals.

The term "digital filter" refers to a computational process or algorithm by which a digital signal or sequence of numbers (acting as an input) is transformed into a second sequence of numbers termed the output digital signal. Digital filters process signals in the digital domain (discrete-time signals), whereas analog filters process signals in the analog domain (continuous-time signals).

It is a mathematical reality that a digital signal cannot contain as much information as can an analog signal. Therefore, to eliminate frequency aliasing, which can occur if a frequency is undersampled, an analog waveform must initially be stripped of frequencies that would, if sampled, be aliased. These frequencies, which exceed the so-called "Nyquist frequency" must be processed by an analog LPF before sampling. The bandlimited continuous-time signal can then be converted to a discrete-time signal by periodic sampling. After processing, the discrete-time signal can be converted back to a continuous-time signal.

In many signal processing applications, it is advantageous to use digital filters instead of analog filters. Some advantages of using digital filters over their analog counterparts are:
 high reliability;
 high accuracy;
 no effect of component drift on system performance;
 component tolerances are not critical;
 finite impulse response; and
 linear phase.
These advantages apply to any digital process.

Another important advantage of digital filters, when implemented with a programmable processor, is the ease of changing filter parameters electronically and automatically to modify the filter characteristics. This feature allows a design engineer to change effectively and easily the characteristics of the designed filter to accommodate changes in application environment.

There are two distinct classes of digital filters: infinite impulse response ("IIR") and finite impulse response ("FIR") filters.

An IIR filter is an infinite-length weighted sum of present and previous inputs to the filter and past outputs from the filter. A general representation of an IIR filter is expressed by the following equation.

$$y(n) = \sum_{K=O}^{N} a_k y(n-k) + \sum_{k=O}^{M} b_k x(n-k)$$

The output of an FIR filter is a finite-length weighted sum of the present and previous inputs to the filter. A general representation of an FIR filter is expressed by the following equation.

$$y(n) = \sum_{k=O}^{M} h(k) x(n-k)$$

The advantages of an FIR filter are its linear phase response and its high degree of stability (no poles).

The above also applies to video signals. Video signals, representing visual images, may be encoded in either analog form or in digital form, wherein the signal comprises a plurality of samples representing chrominance, luminance or color level. Thus encoded, the signal can be processed in any of the above-noted ways.

Scaling an image to reduce its size ("downscaling") requires that a filter must be used to reduce the frequency bandwidth of the image. If the frequency content of the image is not reduced, high frequencies will be undersampled, aliasing will occur and smooth edges within the image will become jagged. FIR filters are normally used to bandlimit the image during the scaling operation.

In many applications, such FIR filters are implemented in a very large scale integrated circuit. However, such filters can take a great deal of silicon area to implement, since digitally-implemented filters comprise a plurality of filter sections, or taps. Thus, the physical area a filter occupies increases as the sharpness of its cutoff increases. Thus, in many designs, filter sections, or taps, are limited, not to optimize filter performance, but out of cost considerations. Thus many such filters do not have very sharp cutoff regions. The lack of a sharp cutoff region means that the highest frequencies may be only attenuated, not eliminated. Thus, these highest frequencies remain after the filtering operation, giving the image a "washed-out" look, especially around the edges of objects. This becomes very apparent if the downscaled image is then scaled to increase its size ("upscaling"). Upscaling also requires a filter to remove harmonics of the original image, appearing as "ghost images."

The combination of these two operations of downscaling to reduce the amount of digital data and upscaling the data up to, perhaps, its original size is used in teleconferencing and compact disk applications to transmit data. For example, a telecommunications system can convert standard TV images to a Common Interchange Format (say, CIF 352 by 288 pels), downscale and compress these images to match a telephone line transmission rate, and send the images to a receiving station, where the images would be decompressed and upscaled to a TV frame size, which could be displayed. Since both the downscaling and compression operations attenuate higher frequencies, the displayed image, following decompression and upscaling, will look washed out. If these high frequencies could be amplified by adjusting the upscaling filter, the image will become sharper. If the sharpening operation could be combined with the upscaling operation (or the downscaling operation), silicon area could be minimized.

The prior state of the art required two separate and distinct operations to accomplish scaling and sharpening: a scaling operation done by a scaling filter and a sharpening operation wherein the image is separated into two intermediate images (normal and LPF filtered images). Next, the two intermediate images are averaged by weighted sum. Finally, frequencies that are common to passband regions of the intermediate normal and LPF filtered images are attenuated resulting in a sharper image.

If F is the frequency response of the normal image and F1 is the response of the LPF filtered image, then the overall frequency response G, where c is a constant (ranging from 0.6–1.0), is given by the following equation:

$$G = \frac{c}{2 \times c - 1} \times F1 - \frac{1 - c}{2 \times c - 1} \times F2$$

where G is a single filter overall frequency response, F1 is a frequency response of a higher resolution LPF and F2 is a frequency response of a lower resolution LPF.

The prior art is entirely devoid of a method for combining these operations of scaling and sharpening into a single FIR filter, the FIR filter occupying the same amount of silicon area as formerly required by the either the scaling or the sharpening filters of the prior art.

Therefore, it is a primary object of the present invention to provide an integrated scaling and sharpening filter, implemented in a very large scale integrated circuit, for scaling and sharpening a digital video signal in a single step.

The filter of the present invent ion is designed to scale a video image either up or down, in a noninteger fashion, and to allow for separate degrees of scaling in the vertical and horizontal directions.

Finally, the filter of the present invention is designed to process video images in real time as they are received.

These and other objects will become apparent in view of the following summary of the invention.

SUMMARY OF THE INVENTION

Accordingly, to accomplish the above noted objects and others, the present invention is the first to provide an apparatus for processing a real input signal representing frames of video information comprising (1) means for filtering a real input signal to produce therefrom a real output signal having desired characteristics, the filtering means selecting and acting in accordance with ones of a series of single filter operating parameters selected as a function of real input signal conditions and (2) means for recalling the selected ones of the parameters from a memory, the parameters mathematically derived by simulating a plurality of virtual input signals and filtering the virtual input signals through multiple virtual filters to produce virtual desired output signals.

Another object of the present invention to provide a digital filter wherein the real input signal is a digital signal.

Still another object of the present invention to provide a digital filter wherein the real output signal is a digital signal.

Yet another object of the present invention to provide a digital filter wherein the filtering means comprises a digital filter.

Still yet another object of the present invention to provide a digital filter wherein the filtering means comprises a finite impulse response filter.

And another object of the present invention to provide a digital filter wherein the plurality of virtual multiple filters are interpolating filters having different numbers of taps.

Another object of the present invention is to provide a digital filter wherein the plurality of virtual multiple filters have similar critical frequencies.

Still another object of the present invention to provide a digital filter wherein one of the plurality of virtual multiple filters has a sharper transition region than another of the plurality of virtual multiple filters.

Yet another object of the present invention to provide a digital filter wherein one of the plurality of virtual multiple filters is interpolated from another of the plurality of virtual multiple filters by a fast Fourier transform algorithm.

Still yet another object of the present invention to provide a digital filter wherein the plurality of virtual multiple filters are combined using the equation:

$$G = \frac{c}{2 \times c - 1} \times F1 - \frac{1 - c}{2 \times c - 1} \times F2$$

where G is a single filter overall frequency response, F1 is a frequency response of a higher resolution LPF, F2 is a frequency response of a lower resolution LPF and c is a constant ranging from 0.6 to 1.0.

In the attainment of the above objects, the preferred embodiment of the present invention is a system for enlarging and sharpening fields (or frames) of video information as represented in a real-time-time input signal comprising (1) means for storing a series of single filter operating parameters from a memory, the parameters mathematically derived by simulating a plurality of virtual input signals and filtering the virtual input signals through discrete, virtual enlarging and sharpening filters to produce virtual desired output signals (2) means for selecting ones of the series of parameters from the memory as a function of real-time input signal conditions and (3) means for filtering a real-time input signal to produce therefrom a real-time output signal having desired characteristics, the filtering means acting in accordance with selected ones of the series of parameters.

The foregoing has broadly outlined the features and technical advantages of the present invention so that the detailed description of the invention that follows may be better understood. Additional features and advantages of the invention will be described hereinafter that form the subject of the claims of the invention. It should be appreciated by those skilled in the art that the conception and the specific embodiment disclosed may be readily used as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention and the advantages thereof, reference is now made to the following descriptions taken in conjunction with the accompanying drawings, in which.

DETAILED DESCRIPTION OF THE INVENTION

Reducing an analog signal (e.g. by a factor of two) can be done by passing a signal through a low pass filter that would eliminate frequencies above the Nyquist frequency, and resampling the filtered signal by performing a sample and hold operation at the output rate that is half of the input rate. A digital resampler may be implemented by converting the analog signal to a digital level sample at a frequency f(in), passing the digital data through a digital low pass filter and followed by a resampler that retains every other point.

However, some differences exist between a digital and an analog filter. Analog filters are made of combinations of operational amplifiers yielding a filter that has both poles and zeros in the transfer function. These filters have both an infinite impulse response (IIR) and usually have a non-linear phase response. Both of these characteristics are undesirable in images producing distortions around sharp transitions in the image. To reduce these effects, FIR filters are used in image scaling. Digital image scaling allows the user to perform digital compression techniques, store the image on a computer, or mix the image with computer graphics.

For these reasons and more, the scaling methods of the present invention involve digital scaling using FIR filters. (When implementing FIR filters for scaling in silicon, care must be taken to produce a quality image in a minimum amount of silicon area. For every stage (tap) of an FIR filter, a multiplier must be implemented (either in silicon area or by running an existing multiplier at a higher rate). In addition, for every tap used for the vertical direction, a line of memory must be added in silicon to store lines for the vertical filtering operation. If image zooming is also required, control must be implemented to create an output rate higher than the input rate.

The current state of the art involves scaling the image up by two in each direction and then scaling down. This requires two different sets of filters to perform one operation. The present invention merges these two operations into one filter, thus saving silicon area. Other operations such as chrominance resampling may also be merged into this single scaling unit (e.g. conversion between 4:2:2 and 4:2:0 resampling).

The mathematics of scaling are well known and will not be repeated herein. To reduce the size of an image, the filter eliminates high frequencies that would cause aliasing. When zooming an image by a factor of n, n copies (harmonics) of the images will be produced. The filter eliminates these copies minus the baseband image. Scaling down an image will wash out an image containing high frequencies. If this image is then zoomed up the image will look even more washed out.

The present invention combines zooming with a sharpening operation, resulting in an improvement in the image quality. The present invention describes a method for providing zooming, shrinking, sharpening and chrominance resampling into the same scaling unit providing for an efficient silicon implementation. In addition, the operation in the horizontal and vertical dimensions are independent allowing for zooming in one dimension while shrinking in the second and visa versa. This implementation involves polyphase filters.

The methodology of the present invention involves the generation of two interpolating filters having different numbers of taps. Filter 1 has twice as many taps (an even number) and twice the frequency resolution as filter 2. If filter 2 is interpolated using a fast Fourier transform program, the two filters will have the same critical frequencies, but filter 1 will still have a finer frequency resolution and a much sharper transition region. If the filters are combined as follows:

$$G = \frac{c}{2 \times c - 1} \times F1 - \frac{1 - c}{2 \times c - 1} \times F2$$

where G is a single filter overall frequency response, F1 is a frequency response of a higher resolution LPF, F2 is a frequency response of a lower resolution LPF and c is a constant ranging from 0.6 to 1.0, the frequencies at the leading edge of the transition region will be attenuated.

An important aspect of the present invention is that Filter 1 have an integer multiple of the number of taps in Filter 2. For example, as described above, Filter 1 has twice as many taps as does Filter 2. Filter 1 could have three, four or five times as many taps. However, If Filter 1 were to have a noninteger multiple of taps, say 1.5 times as many taps as Filter 1, the resulting sets of frequency component lobes of Filters 1 and 2, as will be shown later, would be misaligned with respect to one another, causing beating of frequencies and resulting in poor output image quality.

The present invention for image scaling and sharpening may be viewed as a process that resamples an image at a rate different than the input rate. Although images contain both a horizontal and a vertical dimension, the scaling operations in the horizontal and vertical dimensions can be performed one after the other. Thus, the present invention is disclosed with an explanation of the scaling techniques with respect to only one dimension (the horizontal) with the knowledge that the same techniques may be used in the other dimension (the vertical, provided a memory capable of storing lines of image data is provided).

Figure 1:
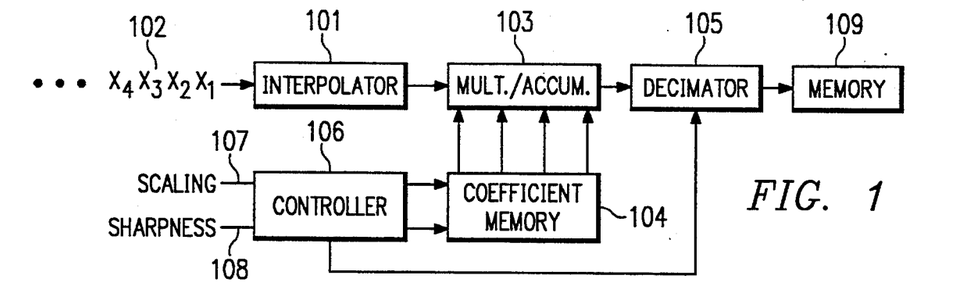
FIG. 1 illustrates a top level block diagram of a circuit for scaling and sharpening digital signals.

Turning now to FIG. 1, shown is a top level block diagram of a circuit for scaling and sharpening digital signals. The circuit comprises an interpolator 101 that receives a plurality of digital samples 102, the samples 102 arriving serially at a predetermined rate not under control of the present invention and, in the preferred embodiment of the present invention, in real time. The interpolator 101 collects and holds, if necessary, the samples 102. A multiplier/accumulator 103 receives the samples 102 from the interpolator 101 and applies, in a manner that will be described more fully later, a plurality of coefficients, delivered from a coefficient memory 104. The coefficient memory 104 stores a plurality of coefficient curves, each curve relating to particular ranges of input variables. As will be shown later, these curves are symmetrical about a centerline. Therefore, the coefficient memory 104 need only store one half of each curve.

From the multiplier/accumulator 103, the samples 102 travel to a decimator 105, that either accepts or rejects particular samples in a manner that will be described later. Finally, acceptable samples 102 are delivered to a memory 109 for storage and later use.

Figure 5:
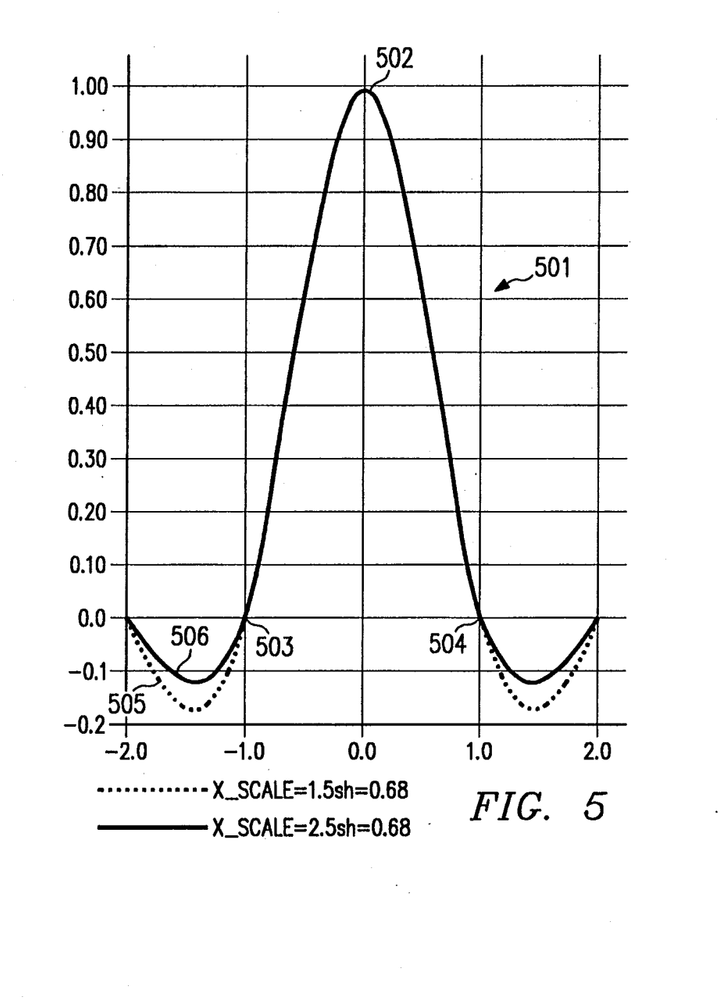
FIG. 5 illustrates a plurality of scaling and sharpening curves for use with the circuit of FIG. 1, the curves varying as a function of desired scaling.
Figure 6:
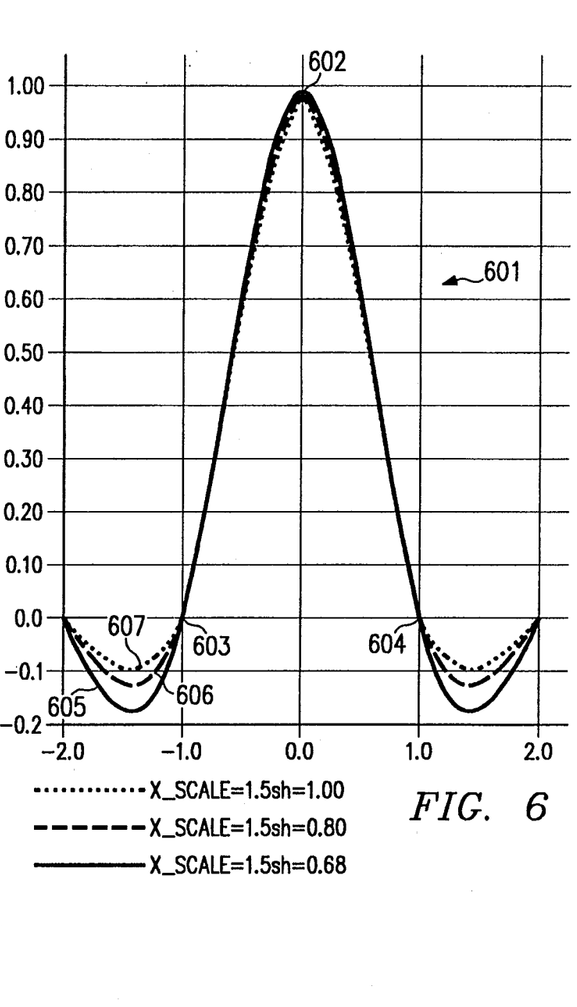
FIG. 6 illustrates a plurality of scaling and sharpening curves for use with the circuit of FIG. 1, the curves varying as a function of desired sharpening.

The coefficient memory 104 and decimator 105 are under control of a controller 106 that has, as its inputs, commands relating to scaling 107 and sharpness 108. Based on the scaling 107 and sharpness 108 inputs, the controller 106 points to particular coefficients stored in the coefficient memory 104. The coefficients are derived from weighting curves, some of which are illustrated in FIGS. 5 and 6. These coefficients are delivered to the multiplier/accumulator 103 and are applied to the samples 102 as they arrive to produce output samples.

The controller 106 also delivers a signal to the decimator 105 that directs the decimator to accept or reject a particular output sample passing through the decimator. The controller 106 bases its decision to accept or reject a particular output on whether the output sample has been validly derived. An output sample is validly derived when it represents a weighted average of the input samples nearest it. The multiplier/accumulator 103 is capable of producing a constant stream of output samples, as it always has access to input samples and selected coefficients. However, unless the output samples thus derived are based on the proper input samples, they are false, and, if not discarded, would serve to distort the output image. Thus, the decimator 105 serves the valuable function of retaining only valid output samples.

Figure 2:
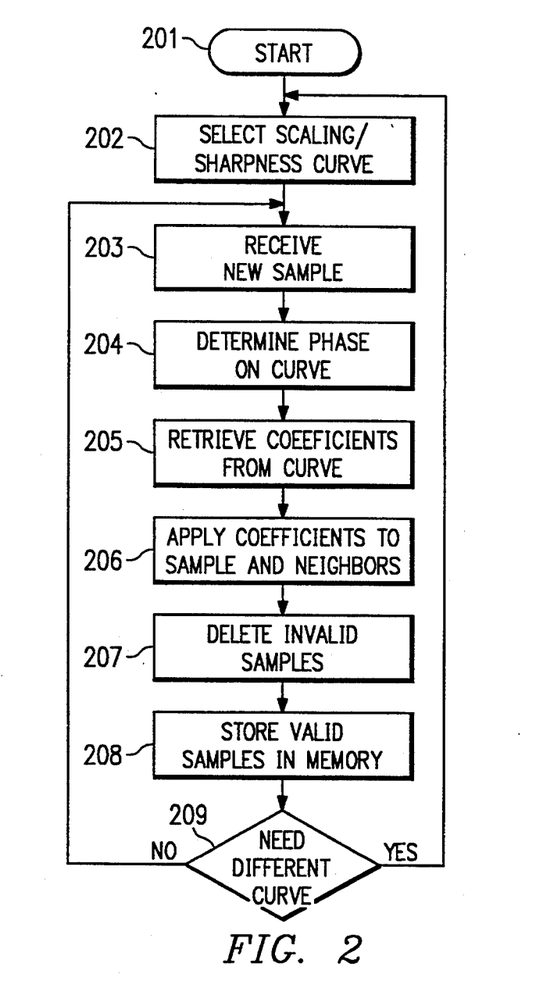
FIG. 2 illustrates a flow diagram for operation of the circuit of FIG. 1.

Turning now to FIG. 2, shown is a flow diagram for operation of the circuit of FIG. 1. Execution begins in a "start" block 201. Execution proceeds to a "select scaling/sharpness curve" block 202 wherein a particular scaling/sharpness curve (the details of which will be explained later) is selected, based upon desired scaling and sharpness variables. This, essentially, is the function of controller 106 of FIG. 1. Execution proceeds to "receive new sample" block 203, wherein a new sample (102 of FIG. 1) is received into the interpolator 101 of FIG. 1. Next, execution proceeds to "determine phase on curve" block 204, wherein the controller 106 of FIG. 1 decides, based on desired scaling and sharpness, where an output sample is in relation to an input sample. This will be explained later. However, at this point, it is sufficient to say that the controller 106 of FIG. 1 produces phase data that is used to select where, on the selected curve, a proper coefficient is to be found.

Execution proceeds to a "retrieve coefficients from curve" block 205, wherein, based upon the selected curve and the selected phase, the controller 106 of FIG. 1 points to a particular location in the coefficient memory 104 of FIG. 1, that location containing coefficients for use with the samples 102 of FIG. 1.

At this point, the new sample resides in the multiplier/accumulator 103 of FIG. 1, along with three proximate samples (the new sample's neighbors). These four input samples, taken together, will be used to produce a single output sample. Next, execution proceeds to an "apply coefficients to sample and neighbors" block 206, wherein four coefficients retrieved from the coefficient memory 104 FIG. 1 are multiplied by the four respective input samples in the multiplier/accumulator 103 of FIG. 1 to produce a single output sample. The output sample is a weighted average of the four input samples. The coefficients are the weights. The output sample is therefore interpolated from the input samples, thereby allowing resampling of a stream of samples at a variable rate. Variable-rate interpolation forms the basis of image upscaling or downscaling. The relative weights given proximate input samples to produce a particular output sample forms the basis of variable sharpening. The present invention is the first to recognize these interrelated concepts.

Next, execution proceeds to a "delete invalid samples" block 207, wherein output samples are determined to be either valid or invalid in a manner that will be described later. Execution next proceeds to a "store valid samples in memory" block 208, wherein output samples that are determined to be valid, are stored in memory 109 of FIG. 1 for later use.

Finally, execution proceeds to a "need different curve?" decisional block 209, wherein the controller 106 of FIG. 1 either selects or does not select a different curve. This is based upon the scaling and sharpness inputs 107, 108 to the controller 106. Each particular curve is valid for a particular scaling and sharpness range. If those inputs 107, 108 move out of the scaling and sharpness range for the active curve, the controller 106 will respond by selecting a different curve based upon the values of the inputs 107, 108. Otherwise, the curve will remain the same. As can be seen in FIG. 2, execution continues to either block 202 or block 203, depending upon whether the answer to decisional block 209 is "yes" or "no."

Figure 3A:
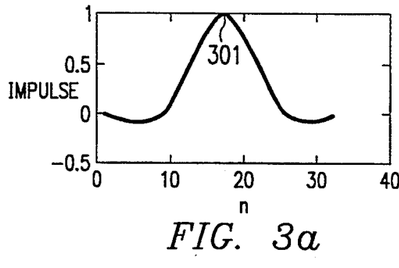
FIG. 3A illustrates an impulse response diagram of a first filter.
Figure 3B:
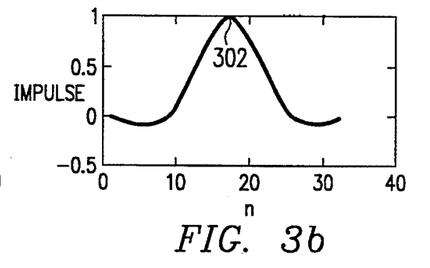
FIG. 3B illustrates an impulse response diagram of a second, more similar filter.
Figure 3C:
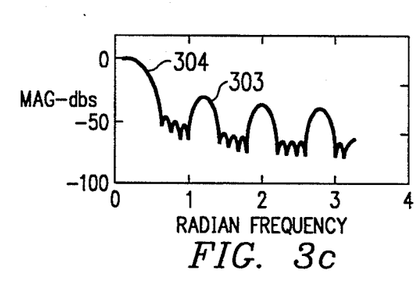
FIG. 3C illustrates a frequency response of the filter produced when the waveforms of FIGS. 3A and 3B are combined according to the invention.
Figure 3D:
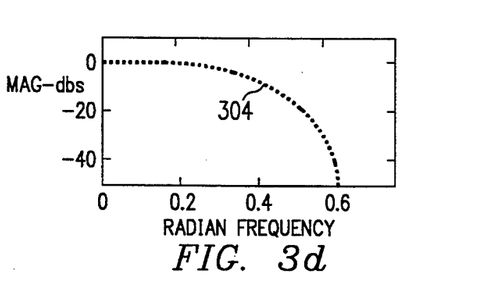
FIG. 3D illustrates an enlarged portion of the waveform of FIG. 3C.

Turning now FIGS. 3A, 3B, 3C and 3D, taken in conjunction, shown are a plurality of curves representing input and output waveforms in an example wherein the output samples are not sharpened. FIG. 3A illustrates an impulse response diagram of a first filter, FIG. 3B illustrates an impulse response diagram of a second, more similar filter, FIG. 3C illustrates a frequency response of the filter produced when the waveforms of FIGS. 3A and 3B are combined according to the invention and FIG. 3D illustrates an enlarged portion of the waveform of FIG. 3C.

As stated before, an input waveform, represented as a plurality of samples received in real time, is filtered by two filters having different lengths, but similar critical frequencies. In FIGS. 3A and 3B, these filters are very similar and can be thought of as being exactly the same. This is shown in FIGS. 3A and 3B as two filtered input waveforms having similar geometries 301, 302. The two waveforms shown in FIGS. 3A and 3B are combined according to the following equation:

$$G = \frac{c}{2 \times c - 1} \times F1 - \frac{1-c}{2 \times c - 1} \times F2$$

where G is a single filter overall frequency response, F1 is a frequency response of a higher resolution LPF, F2 is a frequency response of a lower resolution LPF and c is a constant ranging from 0.6 to 1.0.

The resulting waveform is shown FIG. 3C and comprises a plurality of lobes 303. These lobes 303 indicate frequency components in an image. These components define the visual content in a field or frame of video data. These components can be made sharper and undesirable high frequencies proximate the components can be attenuated through use of the present invention. A particular lobe 304 is shown in FIG. 3D in an enlarged fashion. The lobe 304, as is shown in FIG. 3D, does not contain a sharp transition region. Neither does lobe 304 show attenuation of high frequencies around the transition region. Therefore, the output waveform produced by filters having very similar or identical characteristics will not exhibit increased sharpness. FIG. 3C also shows other lobes, not referenced. These other lobes are difficult to attenuate and do not serve to significantly harm the fidelity of the image. Therefore, the present invention operates on the lobe 304; any change brought about to the other lobes is merely a by-product of operation on the lobe 304.

Figure 4A:
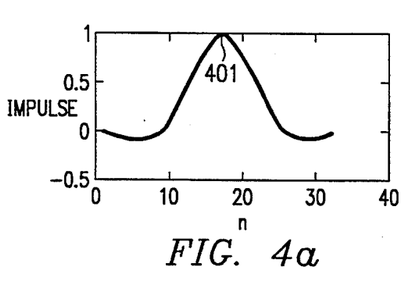
FIG. 4A illustrates an impulse response diagram of a first filter.
Figure 4B:
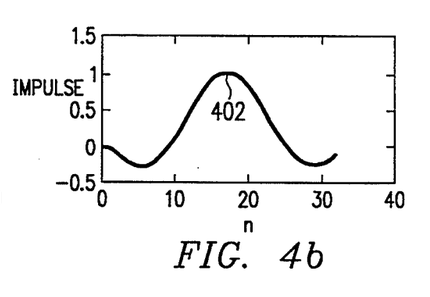
FIG. 4B illustrates an impulse response diagram of a second, less similar filter.
Figure 4C:
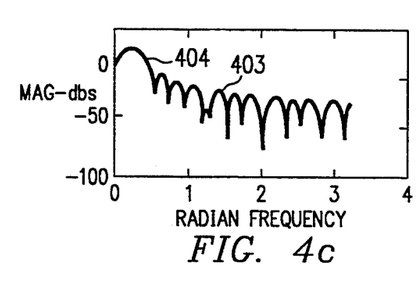
FIG. 4C illustrates a frequency output of the filter produced when the waveforms of FIGS. 4A and 4B are combined according to the invention.
Figure 4D:
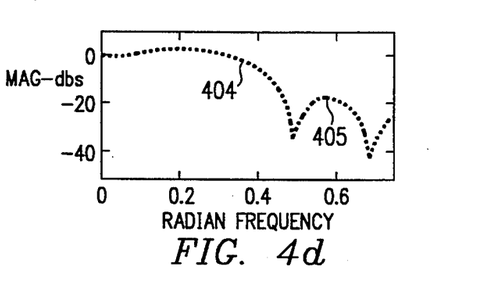
FIG. 4D illustrates an enlarged portion of the waveform of FIG. 4C.

On the other hand, turning now to FIGS. 4A, 4B, 4C and 4D, shown are four figures corresponding to FIGS. 3A, 3B, 3C and 3D. FIG. 4A illustrates an impulse response diagram of a first filter, FIG. 4B illustrates an impulse response diagram of a second, less similar filter, FIG. 4C illustrates a frequency output of the filter produced when the waveforms of FIGS. 4A and 4B are combined according to the invention and FIG. 4D illustrates an enlarged portion of the waveform of FIG. 4C. As shown in FIGS. 4A and 4B, the amplitudes of the impulse responses 401, 402 are different. This difference is due to differences in filter characteristics. The corresponding output waveform shown in FIG. 4C again has a plurality of lobes 403, but the lobes 403 have been accentuated. One lobe 404 is shown in enlarged form in FIG. 4D. Shown are two lobes 404, 405 that have a sharper transition therebetween and high frequencies, that were proximate the lobe 304 of FIG. 3D, are attenuated. This sharpens the resulting image.

Turning now to FIG. 5, shown is a plurality of scaling and sharpening curves for use with the circuit of FIG. 1, the curves varying as a function of desired scaling. The curves, generally designated 501, are actually a set of coefficients or weights that, when applied to input samples, produce output samples having desired characteristics. The most effective way to understand the curves 501 is by way of example. In FIG. 5, there are shown two curves, jointly designated 501. One curve 505 is used when the output image is desired to be scaled up by, at most, a factor of 2.0. Curve 506 is used to scale an image up by, at most, a factor of 2.5. For purposes of FIG. 5, the curves 501 each sharpen the input image to the same extent. Therefore, the difference in the curves is attributable entirely to the scaling function. The ordinate of the graph shown in FIG. 5 is the sample number, as stored in the multiplier/accumulator 103, while the abscissa is the magnitude of each weight.

By way of example, assume it is desired to scale an input image up by a factor of 1.5. Therefore, in the output image, there will be 1.5 samples for each single sample in the input image. Thus, three output samples must be generated from every two input samples. The weighting that gives rise to interpolation and generation of the output samples is derived from the curves 501 of FIG. 5. Specifically, if it is determined that an output sample should be generated at precisely the same point in an image where an input pixel presently exists, the input pixel at that location 0.00, according to curve 505, is weighted at 1.00. Samples on either side of the sample at 0.00 (namely, −1.00 and 1.00 are weighted at 0.00 shown by zero cross-over points 503, 504, respectively. This represents a trivial case and intuitively apparent, since, when one desires to interpolate an output sample at a location that is identical to an input sample, the weighting of the input sample should be total (unitary), and no weight should be given to adjacent samples.

A less trivial case, however, arises with respect to the next output sample to be derived. That output sample must "reside" two-thirds of the way between a first input sample and a second input sample. Therefore, the controller 106 of FIG. 1 must provide an offset to the coefficient memory 104 to thereby access a different part of the curve 505 (effectively bringing about a change in curve phase). In terms of the curve 505, the phase of that curve must be shifted to the left, to a point two-thirds of the distance between −1.00 and 0.00. As shown, this would result in a weight for the first sample of approximately 0.3 and weights for the adjacent samples of approximately −0.1 and 0.8, respectively. The sum of the weights remains 1.00, that is properly normalized. Thus, the curve 505 is selectively sampled along the length thereof to derive coefficients that vary as a function of the relationship of output samples to input samples. It is readily apparent that if the output samples are to be greater in number than the input samples (indicating an upscaling of the input image), then the phase of the curve 505 will retard, or move to the right, as previously shown. On the other hand, if the input image is to be downscaled, the phase will advance, or move to the left. The factor by which the input image is upscaled or downscaled determines the rate of phase change in the curve 505, in other words, the "velocity" of the phase retard or advance.

Of course, it should be recognized that the curve 505 only applies for upscaling to a factor of, at most, 2.0 times the input image size. Therefore, when downscaling or upscaling beyond that factor is required, a different curve will be selected, even though the phase change along that curve will remain the same.

It is important to note that the curves 505, 506 differ with respect to amplitude at their low points. This is so because each curve 505, 506 is selected to best operate with respect to a different range of scaling factor. Curve selection is based on subjective, iterative analysis with a view toward image quality maximization. The difference in these curves 505, 506 is attributable to this analysis.

Turning now to FIG. 6, shown as a plurality of curves, generally designated 601 and comprising curves 605, 606, 607, having maximum 602 and zero cross-over points 603, 604. The curves as shown in FIG. 6 each provide scaling of up to 1.5 times the input image size. However, each of the curves has a different sharpness factor applied. Curve 505 has a sharpness factor of 0.68, that is considered to be a substantial sharpening. Curve 606 has a sharpening factor of 0.80, that produces an output image of somewhat less sharpness, while curve 607 has a sharpness factor of 1.00, indicating no increase in sharpness in the output image over the input image. The explanation given above with respect to scaling in the curves 501 in FIG. 5 applies to the curves in FIG. 6. That is, phase and phase change along the curves are a function of the relationship of the location of output samples with respect to the location of input samples (a function of interpolation of samples).

FIG. 6, however, is shown for the purpose of illustrating the difference in curves brought about by a difference in sharpening factors. It is intuitively apparent in FIG. 6 that the greater the sharpening of the output image, the greater the difference in weighting factors applied to adjacent input samples. This is evidenced by the higher peak-to-peak amplitude characteristic of the curve 605, in comparison with curves 606, 607, each having lower peak-to-peak amplitudes. An increased peak-to-peak amplitude indicates a greater varying in weighting between adjacent samples and, therefore, a greater contrast or change between output samples and attenuation of higher frequencies in transition regions, giving rise to greater image sharpness. The extent to which the output image is sharpened is selectable in the preferred embodiment of the present invention.

Figure 7:
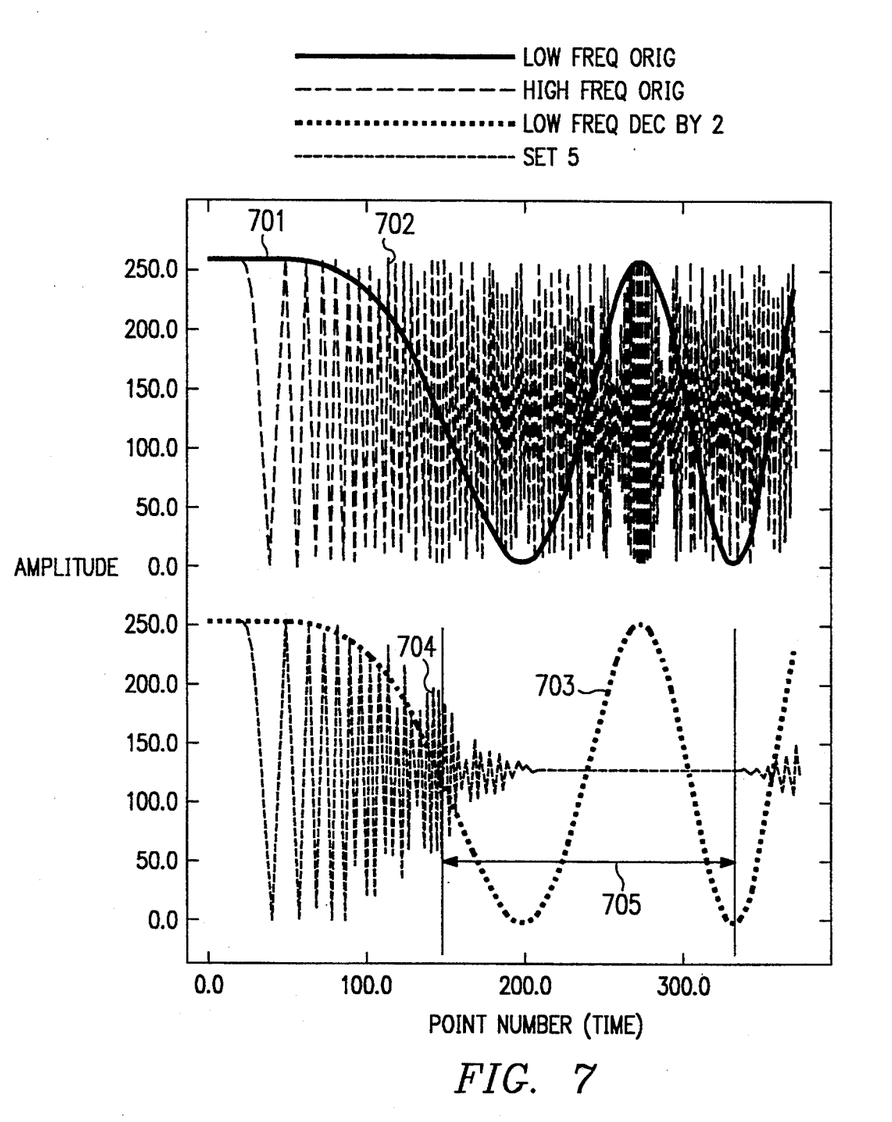
FIG. 7 illustrates decimation of a stream of input samples and attenuation of high frequencies.

Turning now to FIG. 7, illustrated is decimation of a stream of input samples and attenuation of high frequencies. The input samples consist of low frequencies 701 and high frequencies 702. These low and high frequencies 701 and 702 are decimated and sharpened by the filter of the present invention to produce a stream of output samples consisting of low frequencies 703 and high frequencies 704. In FIG. 7, it is important to note that the high frequencies 702 have been substantially attenuated following application of the filter. Thus high frequencies 704 are significantly diminished, particularly within a cutoff region 705.

Figure 8:
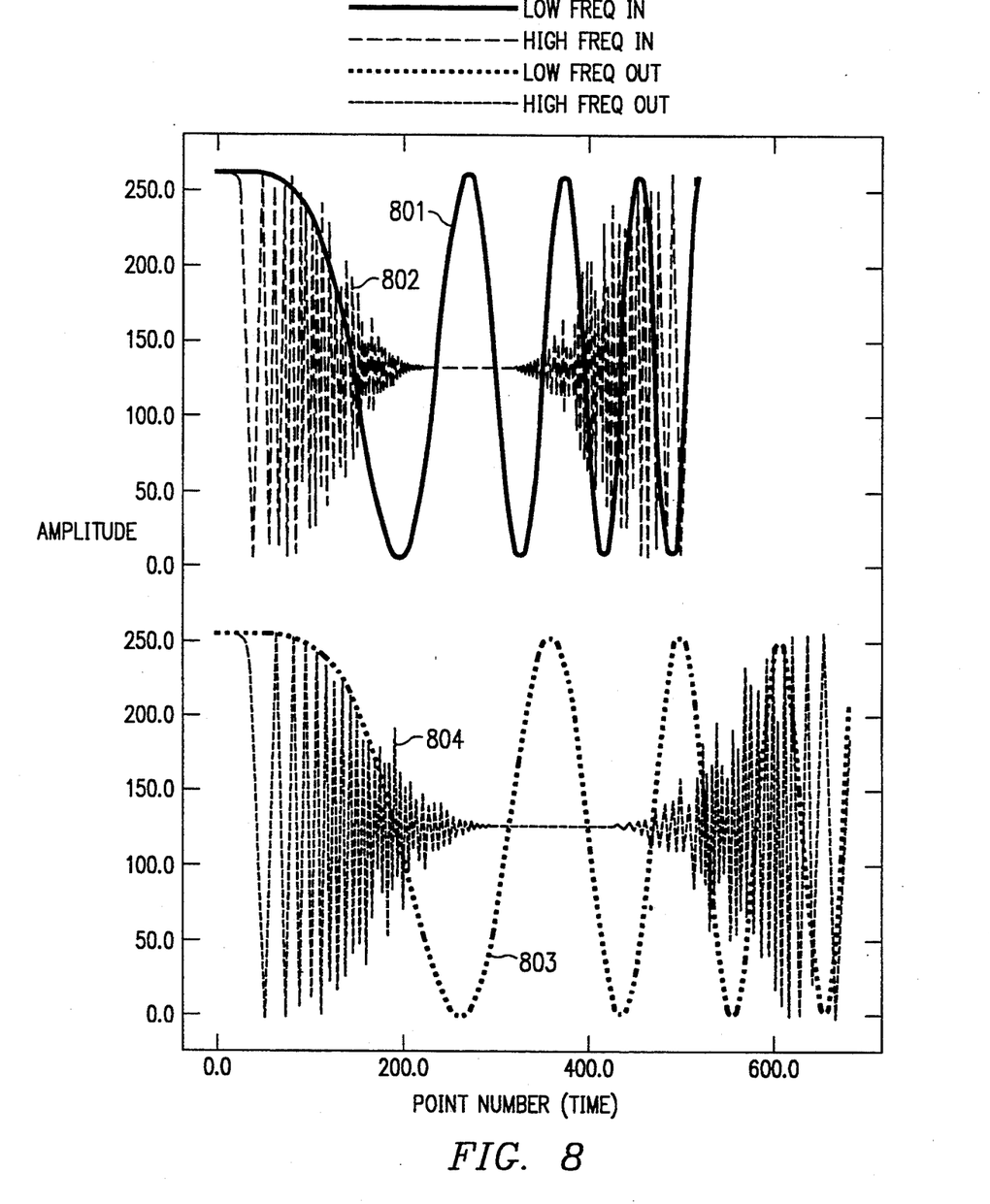
FIG. 8 illustrates interpolation of a stream of sharpening of frequency components; and input samples by a factor of 1.33, but with no

Turning now to FIG. 8, illustrated is interpolation of a stream of input samples by a factor of 1.33, but with no sharpening of components. Again, as in FIG. 7, low and high input and output frequencies 801, 802, 803, 804 are shown, but it is apparent that the output frequencies 803, 804 have a period that is four-thirds of the period of the input frequencies 801, 802. This is interpolation.

Figure 9:
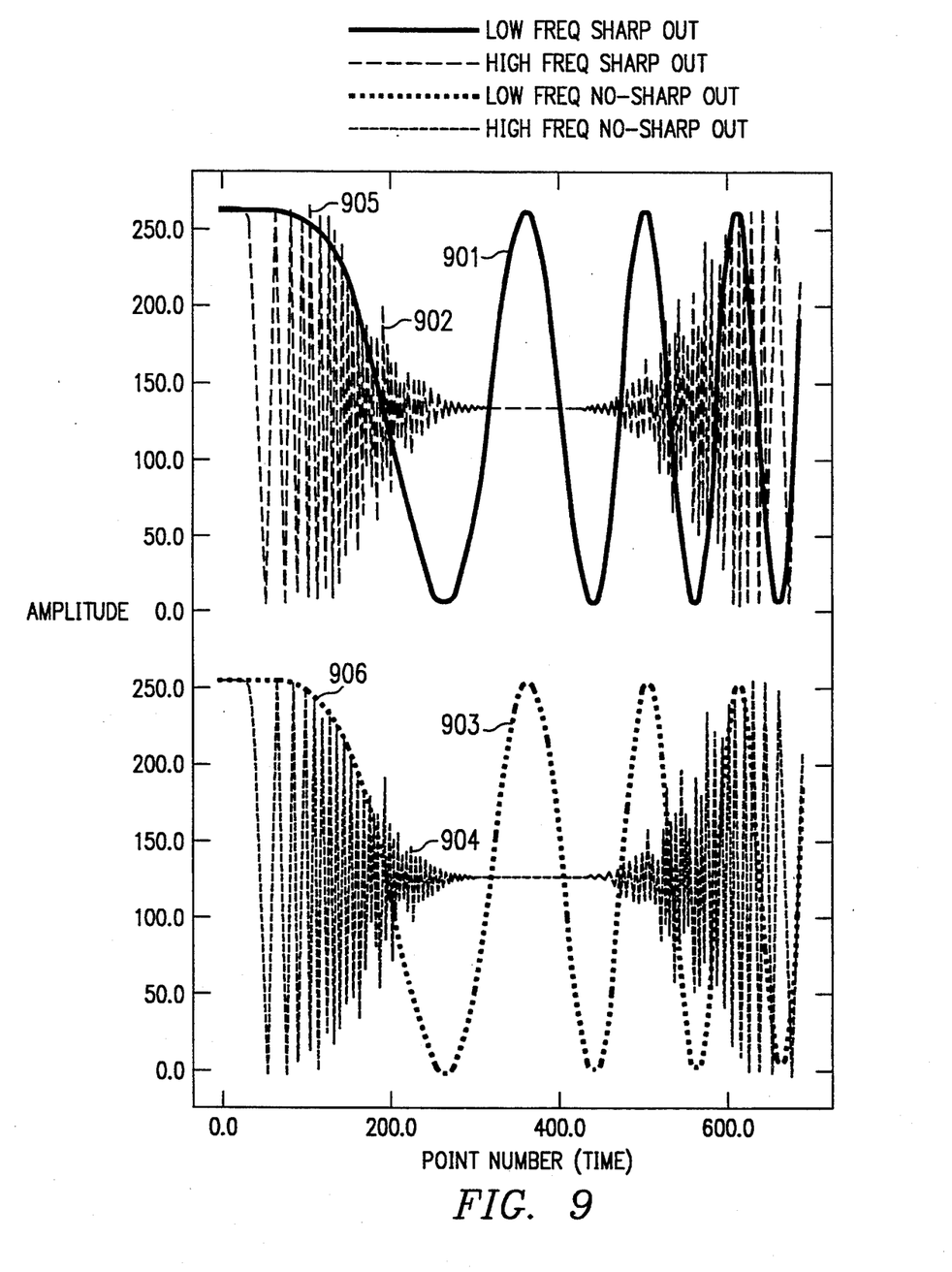
FIG. 9 illustrates interpolation of a stream of input samples by a factor of 1.33 with various sharpenings of frequency components.

Turning now to FIG. 9 illustrated is interpolation of a stream of input samples by a factor of 1.00 with various sharpenings of frequency components therein. Unlike FIGS. 7 and 8, that show input and output sample streams, FIG. 9 shows two output sample streams, each sharpened by a different sharpening factor. Low and high frequencies 901, 902 are sharpened by a factor of 0.68, that results in significant sharpening, while low and high frequences 901, 902 are sharpened by a factor of 1.00, that corresponds to no sharpening whatsoever.

Since both sample streams 901, 902, 903, 904 have been scaled by the same scaling factor, they appear to have the same relative periods.

In FIG. 9 it is important to note that high frequencies, that are present in a region 905, are not present in a corresponding region 906. This increase in amplitude of high frequencies in the region 905 gives rise to greater sharpness of the image, as has been described.

Although the present invention and its advantages have been described in detail, it should be understood that various changes, substitutions and alterations can be made herein without departing from the spirit and scope of the invention as defined by the appended claims.

What is claimed is:

1. An apparatus for processing a real input signal representing frames of video information, comprising:
   means for filtering a real input signal to produce therefrom a real output signal having desired characteristics, said filtering means selecting and acting in accordance with ones of a series of single filter operating parameters selected as a function of real input signal conditions; and
   means for recalling said selected ones of said parameters from a memory, said parameters mathematically derived by simulating a plurality of virtual input signals and filtering said virtual input signals through multiple virtual filters to produce virtual desired output signals.

2. The apparatus as recited in claim 1 wherein said real input signal is a digital signal.

3. The apparatus as recited in claim 1 wherein said real output signal is a digital signal.

4. The apparatus as recited in claim 1 wherein said filtering means comprises a digital filter.

5. The apparatus as recited in claim 1 wherein said filtering means comprises a finite impulse response filter.

6. The apparatus as recited in claim 1 wherein said plurality of virtual multiple filters are interpolating filters having different frequency resolution.

7. The apparatus as recited in claim 1 wherein said plurality of virtual multiple filters have similar critical frequencies.

8. The apparatus as recited in claim 1 wherein one of said plurality of virtual multiple filters has a sharper transition region than another of said plurality of virtual multiple filters.

9. The apparatus as recited in claim 1 wherein one of said plurality of virtual multiple filters is interpolated from another of said plurality of virtual multiple filters by a fast Fourier transform algorithm.

10. The apparatus as recited in claim 1 wherein said plurality of virtual multiple filters are combined using the equation:

$$G = \frac{c}{2 \times c - 1} \times F1 - \frac{1-c}{2 \times c - 1} \times F2$$

where G is a single filter overall frequency response, F1 is a frequency response of a higher resolution LPF, F2 is a frequency response of a lower resolution LPF and c is a constant ranging from 0.6 to 1.0.

11. A method of processing a real input signal representing frames of video information, comprising the steps of:
   storing a series of single filter operating parameters in a memory, said parameters mathematically derived by simulating a plurality of virtual input signals and filtering said virtual input signals through virtual multiple filters to produce virtual desired output signals; and filtering said real input signal with a real single filter to produce therefrom a real output signal having desired characteristics, said real single filter selecting and acting in accordance with selected ones of said single filter operating parameters as a function of real input signal conditions.

12. The method as recited in claim 11 wherein said real input signal is a digital signal.

13. The method as recited in claim 11 wherein said real output signal is a digital signal.

14. The method as recited in claim 11 wherein said real single filter comprises a digital filter.

15. The method as recited in claim 11 wherein said real single filter comprises a finite impulse response filter.

16. The method as recited in claim 11 wherein said plurality of virtual multiple filters are interpolating filters having different frequency resolution.

17. The method as recited in claim 11 wherein said plurality of virtual multiple filters have similar critical frequencies.

18. The method as recited in claim 11 wherein one of said plurality of virtual multiple filters has a sharper transition region than another of said plurality of virtual multiple filters.

19. The method as recited in claim 11 wherein one of said plurality of virtual multiple filters is interpolated from another of said plurality of virtual multiple filters by a fast Fourier transform algorithm.

20. The method as recited in claim 11 wherein said plurality of virtual multiple filters are combined using the equation:

$$G = \frac{c}{2 \times c - 1} \times F1 - \frac{1 - c}{2 \times c - 1} \times F2$$

where G is a single filter overall frequency response, F1 is a frequency response of a higher resolution LPF, F2 is a frequency response of a lower resolution LPF and c is a constant ranging from 0.6 to 1.0.

21. A system for enlarging and sharpening frames of video information as represented in a real-time-time input signal, comprising:

means for storing a series of single filter operating parameters from a memory, said parameters mathematically derived by simulating a plurality of virtual input signals and filtering said virtual input signals through discrete, virtual enlarging and sharpening filters to produce virtual desired output signals;

means for selecting ones of said series of parameters from said memory as a function of real-time input signal conditions; and means for filtering a real-time input signal to produce therefrom a real-time output signal having desired characteristics, said filtering means acting in accordance with selected ones of said series of parameters.

22. The system as recited in claim 21 wherein said real-time input signal is a digital signal.

23. The system as recited in claim 21 wherein said real-time output signal is a digital signal.

24. The system as recited in claim 21 wherein said filtering means comprises a digital filter.

25. The system as recited in claim 21 wherein said filtering means comprises a finite impulse response filter.

26. The system as recited in claim 21 wherein said virtual enlarging and sharpening filters are interpolating filters having different frequency resolution.

27. The system as recited in claim 21 wherein said virtual enlarging and sharpening filters have similar critical frequencies.

28. The system as recited in claim 21 wherein one of said virtual enlarging and sharpening filters has a sharper transition region than another of said virtual enlarging and sharpening filters.

29. The system as recited in claim 21 wherein one of said virtual enlarging and sharpening filters is interpolated from another of said virtual enlarging and sharpening filters by a fast Fourier transform algorithm.

30. The system as recited in claim 21 wherein said virtual enlarging and sharpening filters are combined using the equation:

$$G = \frac{c}{2 \times c - 1} \times F1 - \frac{1 - c}{2 \times c - 1} \times F2$$

where G is a single filter overall frequency response, F1 is a frequency response of a higher resolution LPF, F2 is a frequency response of a lower resolution LPF and c is a constant ranging from 0.6 to 1.0.

31. An apparatus for processing a real input signal representing frames of video information, comprising:

means for storing a plurality of coefficients in a memory, the coefficients representing weighting factors; and means for applying selected ones of said coefficients to a plurality of received input samples, said coefficients selectably sharpening and providing a basis for selectable interpolation of said input samples to thereby produce a plurality of output samples.

32. The apparatus as recited in claim 31 wherein said input samples represent a portion of a digitized input visual image.

33. The apparatus as recited in claim 32 wherein said output samples represent a portion of a digitized output visual image.

34. The apparatus as recited in claim 33 wherein said output visual image is a scaled representation of said input visual image.

35. The apparatus as recited in claim 34 wherein said output visual image comprises a plurality of visual features having components between said visual features.

36. The apparatus as recited in claim 35 wherein said apparatus sharpens said components.

* * * * *